United States Patent [19]

Hurt

[11] 3,797,611
[45] Mar. 19, 1974

[54] SPRING AND SPRING INSTALLATION
[75] Inventor: Harmon C. Hurt, Dayton, Ohio
[73] Assignee: General Motors Corporation, Detroit, Mich.
[22] Filed: Oct. 30, 1972
[21] Appl. No.: 302,081

[52] U.S. Cl............. 188/71.8, 188/196 P, 188/217, 267/161, 267/167
[51] Int. Cl............................................. F16d 55/02
[58] Field of Search............... 188/196 P, 71.8, 217; 267/161, 167, 155, 156, 159, 163, 180

[56] References Cited
UNITED STATES PATENTS
3,221,854  12/1965  Jaeschke et al. ................. 188/196 P
3,389,642  6/1968  Robinette ...................... 267/161 X
3,439,781  4/1969  Ostwald........................... 188/196 P
3,649,092  3/1972  Coleman......................... 267/161 X Primary Examiner—Robert J. Spar
Attorney, Agent, or Firm—D. D. McGraw

[57] ABSTRACT

A disc brake adjuster mechanism of the type using a threaded adjuster nut and nested pistons having a clutch therebetween, with a marcel spring having two active sections acting between a surface on one of the pistons and surfaces on the other piston and the adjuster nut, respectively, to maintain brake adjustment when the brake is either pressure or mechanically actuated.

7 Claims, 3 Drawing Figures

PATENTED MAR 19 1974 3,797,611

SPRING AND SPRING INSTALLATION

The invention relates to a spring having marcels or undulations in two active sections, and more particularly to such a spring installation in a disc brake caliper assembly which provides for pressure actuation during service braking, mechanical actuation for parking, and automatic adjustment for brake lining wear. The invention is particularly useful in the brake mechanism disclosed and claimed in my Patent Application Ser. No. 302,084, entitled "Brake Actuator and Adjuster Mechanism" filed on even date herewith.

It is desirable in an automatic disc brake caliper assembly to provide hydraulic pressure actuation of the brakes for service braking and mechanical actuation of the brakes for parking when the parking brake is provided as a part of the same brake assembly as that of the service type disc brake. It is also desirable to provide an automatic lining wear adjusting mechanism which maintains the brake shoes in close relationship to the disc when the brakes are released so that a minimal amount of brake shoe travel is required to brake the vehicle.

The disc brake caliper assembly in which the invention herein disclosed and claimed is utilized has a pair of pistons connected through a clutch mechanism, one piston being rotatably and slidably received in the other, with spring means embodying the invention normally maintaining the clutch in engagement under an axial preload force which is less than that required to lock the clutch so as to prevent rotation of the inner piston relative to the outer piston. The outer piston is normally held against rotation at all times during brake operation. An adjuster nut is slidably mounted in the inner piston but is not rotatable relative thereto due to a suitable connection such as a spline arrangement between the adjuster nut and inner piston. The adjuster nut is threaded on a shaft having a high lead screw arrangement, the shaft being rotatable by a parking brake pedal and cable mechanism to move the adjuster nut in the brake actuating direction and transmitting axial force through the pistons and clutch arrangement to actuate the brake. The adjuster nut is also urged axially toward the disc by the spring means under an axial preload force. Upon brake release, whether mechanically or hydraulically applied, the adjuster nut may be moved rotationally and axially by the spring means, with the clutch slipping to permit rotation of the inner piston relative to the outer piston, until the slack, if any, created by brake lining wear is taken up. The mating threads of the screw and adjuster nut are provided with a slight axial clearance, on the order of 0.006 to 0.008 inches, for example, to permit the pistons and the adjuster nut to move slightly away from the disc to allow for brake lining expansion due to heat.

The spring means and installation embodying the invention is a marcel spring with first and second active sections which react on one surface and respectively act on two other surfaces. The first active section extends circumferentially and has a plurality of waves or undulations which provide axially extending points of contact alternately engaging the surfaces on which it acts and reacts. It has circumferentially adjacent ends bent radially inwardly to join the second active section, the bent ends contacting the reaction surface. The second active section has two portions each extending from the bent ends generally chordally and terminating in engagement with the reaction surface generally opposite the bent ends. They have undulations in their intermediate parts which provide points of contact with the surface on which the second section acts. In the preferred embodiment disclosed, the spring is made from one continuous piece of round spring stock with the terminal ends thereof located generally opposite the bent ends, and separating the two parts of the second active section. The terminal ends could be similarly located in the first active section, with the two parts of the second active section opposite the bent ends being joined by a U-bend. The two surfaces on which two active sections act are preferably annular and concentrically arranged, with the reaction surface being annular and including a common cylinder of revolution with the larger of the two other surfaces.

IN THE DRAWING

Figure 1:
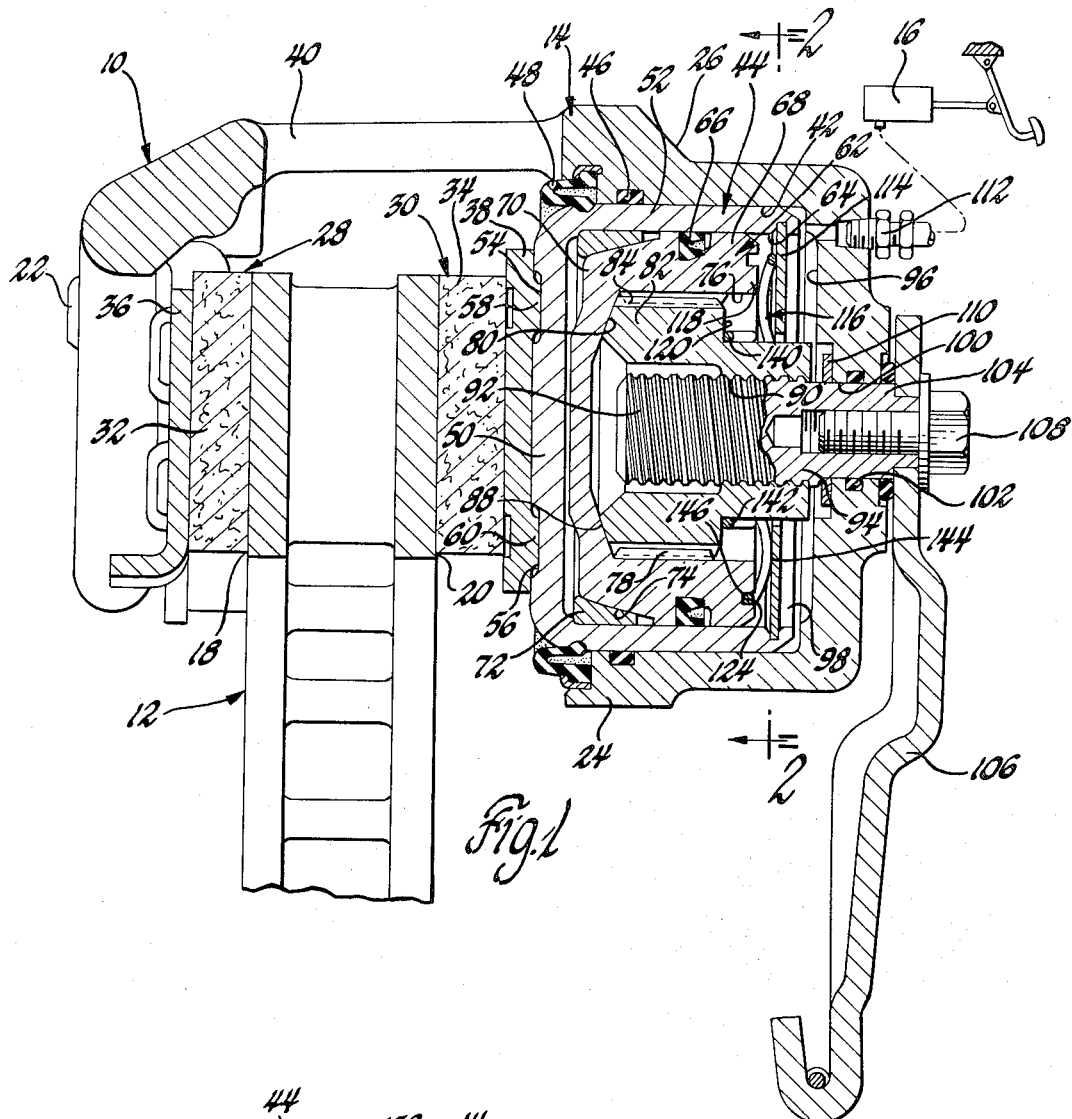
FIG. 1, is a cross-section view of a disc brake caliper assembly embodying the invention.
Figure 2:
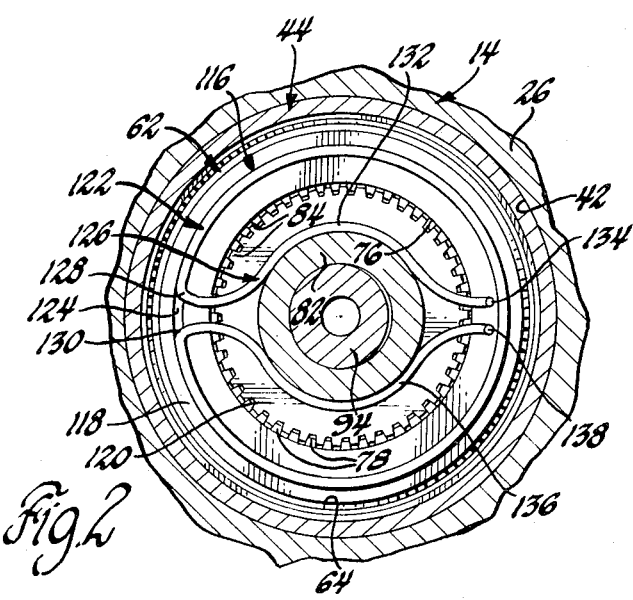
FIG. 2 is a cross-section view of a portion of the brake assembly of FIG. 1 with parts broken away and taken in the direction of Arrows 2—2 of that FIGURE.
Figure 3:
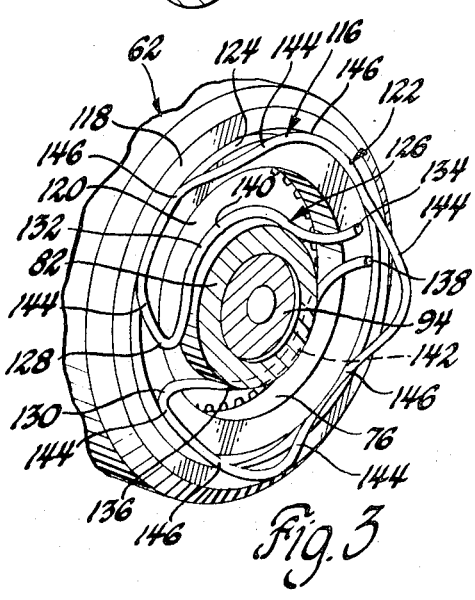
FIG. 3 is a perspective view of the spring embodying the invention and shown in its installed position in FIGS. 1 and 2.

The disc brake 10 includes a rotatable disc 12, a caliper assembly 14 and a suitable hydraulic pressure actuating mechanism schematically shown as a master cylinder 16. While the disc brake assembly is of the sliding caliper type, the invention may be used in other types of brake mechanisms.

The disc 12 has opposed friction surfaces 18 and 20 positioned between the opposite legs 22 and 24 of the caliper housing 26. The brake pad assemblies 28 and 30 have brake linings 32 and 34 respectively secured to braking plates 36 and 38 so that the linings are frictionally engageable with the disc friction surfaces 18 and 20. Brake pad assembly 28 is suitably mounted on caliper housing leg 22 so that it is held in position relative to disc 12 and transmits brake torque to the caliper housing. The caliper legs are joined by a bridging section 40 positioned over the outer periphery of the disc 12 and suitably arranged to take brake torque from both brake pad assemblies in a manner well known in the art.

The leg 24 of the caliper housing has a cylinder 42 formed therein and opening toward disc 12. A first piston 44 is received in cylinder 42 for reciprocable and rotatable movement. A suitable seal 46 is provided to seal brake actuating pressure in cylinder 42, and a boot 48 is provided to seal the outer opening of the cylinder. Piston 44 has a head section 50 which engages the side of backing plate 38 opposite brake lining 34, and a skirt section 52 which extends into cylinder 42. The outer surface of piston head section 50 has depressions 54 and 56 formed therein and receiving bosses 58 and 60 which are formed on backing plate 38. These bosses and depressions prevent rotation of piston 44 in cylinder 42 when the brake pad assembly 30 is installed since the braking plate 38 is provided with extensions on the ends thereof which engage the caliper housing bridging section 40 to prevent circumferential movement of the brake pad assembly in either direction.

A second piston 62 is received within the cylinder 64 formed by the skirt section 52 of the first piston 44 so that it is rotatable relative to the first piston and also axially movable in the cylinder 64. A suitable seal 66 is provided in the outer wall of the skirt section 68 of the second piston 62 and seals against cylinder 64. The second piston 62 also has a head section 70 which is positioned adjacent to head section 50 of the first piston. A clutch element 72, illustrated as a clutch cone seat, is provided within first piston 44 and is suitably secured thereto against rotation. Element 72 is illustrated as having been press fitted in cylinder 64 and is located adjacent the piston head section 50. The second piston 62 has a clutch element 74 formed thereon substantially at the junction of its skirt section 68 and head section 70, the clutch element 74 being illustrated as a clutch cone which mates with the clutch element 72. The entire second piston 62, including clutch element 74 may be referred to as a clutch cone.

The second piston skirt section 68 has a cylinder 76 formed within it, the cylinder wall having axially extending splines 78 formed thereon. The base of cylinder 76 defined by one side of piston head 70 has a force transmitting surface 80 provided thereon so that axial force may be transmitted through the second piston 62 in a manner to be described.

An adjuster nut 82 is received within cylinder 76 of the second piston 62 and has external splines 84 thereon mating with splines 78 so that the nut is movable axially within the cylinder 76 but cannot move rotationally relative to the second piston 62. The forward end 86 of nut 82 has an axial force transmitting surface 88 engageable with the force transmitting surface 80 of piston 62. Nut 82 has internal high lead threads 90 and the nut is threaded on the threads 92 of a screw or shaft 94 mounted in the base wall 96 of cylinder 42. Base wall 96 is a part of the caliper housing 26. The threaded portion 92 of shaft 94 extends axially into the chamber 98 defined by pistons 44 and 62, cylinder 42 and its base wall 96.

Shaft 94 is rotatably mounted in the base wall through opening 100, with a seal 102 sealing the opening in the shaft. The outer end 104 of shaft 94 extends outwardly of the housing 26 and has a brake actuating lever 106 secured thereto by suitable means such as bolt 108. A thrust washer 110 is provided on shaft 94 adjacent a portion of the shaft passing through base wall 96 and transmits axial reaction force from the shaft to the base wall. This is the arrangement used when mechanical brake actuation is provided for parking. On brakes without a parking brake requirement, shaft 94 mey be suitably secured to base wall 96.

A suitable fitting 112 is connected with chamber 98 and to master cylinder 16 to supply hydraulic actuating pressure to the chamber. Other types of pressure supply mechanisms may be provided, depending upon the type of brake operating system being used.

The outer end of cylinder 64 of the first piston 44 has a retainer 114 secured therein, the retainer being a suitable snap ring, for example. A spring 116 engages retainer 114, the end 118 of the second piston skirt section 68, and a shoulder 120 formed on adjuster nut 82. Spring 116 is a marcel spring and has two active sections. The outer active section 122 extends circumferentially and is placed axially between surfaces on the retainer 114 and the skirt end 118. A groove 124 formed in skirt end 118 receives the spring and holds it radially in position. The spring inner active section 126 connects with the spring outer active section 122 at the reverse bends 128 and 130, which are circumferentially adjacent each other. The spring inner section 126 is formed in two parts, one part 132 extending from reverse bend 128 generally chordally and in a smaller circumferential arc than that of outer section 122 and about a portion of the adjuster nut 82 adjacent shoulder 120, terminating in an end 134 which is generally diametrically opposite reverse bend 128 and is radially outward a sufficient distance to engage retainer 114. The other spring inner section part 136 is similarly constructed so that it is positioned radially opposite part 132 and its end 138 also engages retainer 114. The arcuate portions of parts 132 and 136 intermediate the respective reverse bends 128 and 130 and ends 134 and 138 are marcelled so that they provide points of engagement 140 and 142 which engage the surface of shoulder 120 of adjuster nut 82. The spring outer section 122 has similar waves or undulations which provide points of engagement 144 and 146, points 144 engaging the surface of retainer 114 and points 146 engaging the end surface of piston 62.

The spring outer section 122 is preloaded in compression so that it holds the clutch elements 72 and 74 in clutching engagement but with an insufficient axial force to lock the clutch against rotation. When, for example, the clutch cone angle is in the range of 30° to 35° from the piston axis, and in a typical size for use in passenger vehicles, the clutch elements may require a forty pound axial load to lock against rotation. Therefore, the preload of spring outer section 122 is on the order of thirty pounds.

The spring inner section 126 is also axially preloaded to urge adjuster nut 82 axially so that surfaces 80 and 88 are engaged in axial force transmitting relation. As will be seen later, any space occurring between surfaces 80 and 88 during the latter portion of the brake release step reflects the amount of axial slack for which adjustment is provided.

During service brake operation, the brake assembly is actuated by the introduction of fluid pressure into chamber 98 through fitting 112 from a source of brake actuating pressure such as master cylinder 16. This pressure acts on the effective surfaces of first piston 44 and second piston 62 to exert an axial force urging these pistons toward disc 12. Since the clutch 72 and 74 are normally held engaged by spring 116, the axial force generated by pressure acting on piston 62 is transmitted through the clutch elements to piston 44 and joins with the axial force generated by the pressure acting on piston 44. These forces are transmitted to he brake pad assembly 30 and the brake lining 34 of that assembly frictionally engages surface 20 of the disc 12. The reaction force generated by the pressure acts on housing 26 to generate a force tending to move the caliper frame in the opposite direction, thereby causing the friction lining 32 of brake pad assembly 28 to engage surface 18 of the disc 12. As the pressure increases, the axial forces applying the brake pad assemblies to the disc also increase, causing the disc to be braked. If the brake linings were worn to any extent, the movement of the pistons 44 and 62 relative to the housing would take up the slack so as to engage the linings with the disc. Also, during increasing pressure and subject to any movement of piston 44 in the brake actuating direction, the inner active section 126 of spring 116 would tend to be further compressed, increasing the axial force on adjuster nut 82 which urges the nut in the brake actuating direction. However, since the axial force exerted through the clutch elements has increased sufficiently to prevent rotation of piston 62 relative to piston 44, the nut 82 cannot rotate and therefore cannot move axially because of its threaded relation with shaft 94. Therefore, an axial space or slack will occur between surfaces 80 and 88 commensurate with the movement required to engage the brake shoes with the disc. Some small part of this space may also be contributed by a slight spreading of the caliper legs as well as slight compression of the linings.

Upon release of the pressure in chamber 98, the portions of the created space between surfaces 80 and 88 generated by caliper spread and lining compression will be recovered well before the total axial force through the clutch elements decreases to the point where the clutch is no longer locked against rotation. Therefore, the remaining space is primarily the result of brake lining wear after the last brake adjustment. When the axial force falls below that required to keep the clutch locked, the axial force urging nut 82 toward the disc 12, exerted primarily by the preload on spring inner section 126, causes the nut to rotate on the high lead screw threads 92, rotating the second piston 62 with it. The clutch elements slip to permit this rotation. The amount of axial movement is limited to that required to take up the axial space between surfaces 80 and 88, and the adjuster nut 82 is repositioned on shaft 94 slightly closer to the disc than before. Further decrease of pressure in chamber 94 only lessens the force resisting movement of the brake pad assembly and the pistons away from the disc. However, any force tending to push them further away, such as knock-back forces, keep the clutch engaged and the second piston and adjuster nut axially engaged with sufficient force so that the nut is not permitted to move axially away from the disc. Therefore, the new adjusted position is maintained. By providing a small amount of axial clearance between the threads 92 of shaft 94 and the threads 90 of the adjuster nut 82, as discussed above, sufficient space is provided to fully permit disengagement of the linings relative to the disc, even though the linings may have expanded slightly due to heating.

When the brake is mechanically actuated, the parking brake cable 148 is tensioned to rotate shaft 94 by means of lever 106. This rotates the threads 92, moving the nut 82 axially toward the disc 12 with some axial force. Initially, the nut moves axially because there is less resistance to its axial and rotary movement than there is to rotation of the nut and piston 62 at the engagement points of clutch elements 72 and 74. This movement also increases the axial force transmitted through these clutch elements, quickly raising that force above the force required to lock the clutch elements against relative movement. As the shaft 94 continues to be rotated, additional force is exerted in the brake applying direction, and the pistons 44 and 62 and the brake pad assembly 30 are moved to engage the lining with the disc. Reaction to this force is transmitted to the caliper housing through thrust washer 110 so that the force is transmitted through the caliper housing to apply the lining 32 of brake pad assembly 28 to the other side of the disc, actuating the brake. When the parking brake mechanism is released, the reaction force exerted through adjuster nut 82 on the shaft is no longer resisted by cable tension, causing the shaft to rotate toward a brake release position and the adjuster nut moves axially in a direction away from disc 12 to release the brake. The same adjusting action takes place as described above with regard to hydraulic actuation.

When the brake linings wear sufficiently to be replaced, the adjuster nut 82 has moved axially a considerable distance toward the disc 12 on shaft 94. Since brake backing plate 38 holds piston 44 against rotation, the pistons cannot be moved back into cylinder 42 by merely pushing on them. To reset the assembly, the old brake pad assembly 30 is removed, allowing piston 44 to rotate in cylinder 42. The piston is manually rotated, along with piston 62 and adjuster nut 82, to thread the nut back toward base wall 96 on shaft 94. New brake pad assemblies are then installed. Upon the first brake actuation, the adjuster nut is again positioned to hold the proper amount of adjustment, and the brake is operational. Alternatively, the lever 106 may be removed to permit shaft 94 to rotate in opening 100 when piston 44 is forced toward the base wall 96. This force causes nut 82 to drive shaft 94 rotationally as the piston and nut are returned axially to the position shown in FIG. 1. New Brake pad assemblies are then installed, lever 106 is reattached, and the brake is operational.

The spring embodying the invention may also be used in other installations requiring separate spring loads to be exerted on two surfaces with a third surface taking the reaction for both spring loads.

What is claimed is:

1. A marcel spring having first and second active sections for acting on first and second surfaces and reacting on a third surface;

said first active section extending circumferentially with arcuately adjacent reversely bent ends adapted for engagement with the third surface, the portion of said first active section between said reversely bent ends having a plurality of undulations for contacting the first and third surfaces at alternating circumferentially spaced points;

said second active section being comprised of two portions each extending generally chordally from one of said reversely bent ends and having a terminal end positioned radially adjacent said first active section portion, said terminal ends being adapted to contact the third surface, each of said two portions further having at least one undulation intermediate its terminal end and its reversely bent end providing a point for contacting the second surface.

2. A marcel spring having first and second active sections for acting on first and second surfaces and reacting on a third surface;

said first active section extending circumferentially with arcuately adjacent reversely bent ends adapted for engagement with the third surface, the portion of said first active section between said reversely bent ends having a plurality of undulations for contacting the first and third surfaces at alternating circumferentially spaced points;

said second active section being comprised of two portions each extending generally chordally from one of said reversely bent ends and being bowed arcuately outward in their generally chordally extending parts intermediate their ends for embracing a member extendable therethrough and having a terminal end positioned radially adjacent said first active section portion, said terminal ends being adapted to contact the third surface, each of said two portions further having at least one undulation intermediate its terminal end and its reversely bent end providing a point for contacting the second surface.

3. A marcel spring having first and second active sections for acting on first and second surfaces and reacting on a third surface;

said first active section extending circumferentially with arcuately adjacent reversely bent ends adapted for engagement with the third surface, the portion of said first active section between said reversely bent ends having a plurality of undulations for contacting the first and third surfaces at alternating circumferentially spaced points;

said second active section being comprised of two portions each extending generally chordally from one of said reversely bent ends and having a terminal end positioned radially adjacent said first active section portion, said terminal ends being adapted to contact the third surface, each of said two portions further having at least one undulation intermediate its terminal end and its reversely bent end providing a point for contacting the second surface;

the axial extension of the undulations of one of said spring active sections being greater than the axial extension of the undulations of the other of said spring active sections.

4. A spring installation having an annular first surface and concentric second and third surfaces facing said first surface axially;

a marcel spring having first and second active sections positioned with said first active section engaging said first and second surfaces and said second active section engaging said first and third surfaces;

said first active section having a plurality of undulations providing axially extending points of alternate circumferentially spaced engagement with said first and second surfaces, and circumferentially adjacent ends bent radially inwardly to join said second active section, said bent ends contacting said first surface;

said second active section having diametrically opposite portions extending from said bent ends generally chordally and terminating in engagement with said first surface generally opposite said bent ends and having undulations providing diametrically opposed points contacting said third surface.

5. In a spring installation having an annular first surface and concentric second and third surfaces facing said first surface axially;

a marcel spring having first and second active sections positioned with said first active section engaging said first and second surfaces and said second active section engaging said first and third surfaces;

said first active section having a plurality of undulations providing axially extending points of alternate circumferentially spaced engagement with said first and second surfaces, and circumferentially adjacent ends bent radially inwardly to join said second active section, said bent ends contacting said first surface;

said second active section having diametrically opposite portions extending from said bent ends generally chordally and terminating in engagement with said first surface generally opposite said bent ends and having undulations providing diametrically opposed points contacting said third surface;

said spring being formed from one continuous stock piece with one of said active sections including the terminal ends thereof located generally opposite said bent ends.

6. A spring installation having an annular first surface and concentric second and third surfaces facing said first surface axially;

a marcel spring having first and second active sections positioned with said first active section engaging said first and second surfaces and said second active section engaging said first and third surfaces;

said first active section having a plurality of undulations providing axially extending points of alternate circumferentially spaced engagement with said first and second surfaces, and circumferentially adjacent ends bent radially inwardly to join said second active section, said bent ends contacting said first surface;

said second active section having diametrically opposite portions extending from said bent ends generally chordally and terminating in engagement with said first surface generally opposite said bent ends and having undulations providing diametrically opposed points contacting said third surface;

said spring being formed from one continuous stock piece with one of said active sections including the terminal ends thereof located generally opposite said bent ends, said terminal ends being in said second active section where said second active section engages said first surface.

7. A spring installation having an annular first surface and concentric second and third surfaces facing said first surface axially;

a marcel spring having first and second active sections positioned with said first active section engaging said first and second surfaces and said second active section engaging said first and third surfaces;

said first active section having a plurality of undulations providing axially extending points of alternate circumferentially spaced engagement with said first and second surfaces, and circumferentially adjacent ends bent radially inwardly to join said second active section, said bent ends contacting said first surface;

said second active section having diametrically opposite portions extending from said bent ends generally chordally and terminating in engagement with said first surface generally opposite said bent ends and having undulations providing diametrically opposed points contacting said third surface;

and said first and second surfaces being annular and including a common cylinder of revolution, and said third surface having a smaller diameter than the diameter of said cylinder of revolution.

* * * * *